United States Patent
Stanjek et al.

(10) Patent No.: US 9,340,714 B2
(45) Date of Patent: May 17, 2016

(54) CROSS-LINKABLE MASSES BASED ON ORGANYL-OXYSILANE-TERMINATED POLYURETHANES

(71) Applicant: Wacker Chemie AG, Munich (DE)

(72) Inventors: Volker Stanjek, Ampfing (DE); Lars Zander, Altoetting (DE)

(73) Assignee: Wacker Chemie AG, Munich (DE)

( * ) Notice: Subject to any disclaimer, the term of this patent is extended or adjusted under 35 U.S.C. 154(b) by 192 days.

(21) Appl. No.: 14/361,989

(22) PCT Filed: Nov. 15, 2012

(86) PCT No.: PCT/EP2012/072708
§ 371 (c)(1),
(2) Date: May 30, 2014

(87) PCT Pub. No.: WO2013/079330
PCT Pub. Date: Jun. 6, 2013

(65) Prior Publication Data
US 2014/0311674 A1    Oct. 23, 2014

(30) Foreign Application Priority Data
Dec. 1, 2011  (DE) .................. 10 2011 087 603

(51) Int. Cl.
| | | |
|---|---|---|
| *C09J 175/04* | (2006.01) |
| *C09D 175/04* | (2006.01) |
| *C08G 18/10* | (2006.01) |
| *C08G 18/48* | (2006.01) |
| *C08G 18/76* | (2006.01) |
| *C08G 18/22* | (2006.01) |
| *C09J 175/08* | (2006.01) |

(52) U.S. Cl.
CPC ............... *C09J 175/04* (2013.01); *C08G 18/10* (2013.01); *C08G 18/227* (2013.01); *C08G 18/4825* (2013.01); *C08G 18/7621* (2013.01); *C08G 18/7671* (2013.01); *C09D 175/04* (2013.01); *C09J 175/08* (2013.01)

(58) Field of Classification Search
CPC ............................. C09J 175/04; C09D 175/04
USPC ........................................................ 156/331.4
See application file for complete search history.

(56) References Cited

U.S. PATENT DOCUMENTS

| | | |
|---|---|---|
| 7,589,134 B2 | 9/2009 | Pfenninger et al. |
| 8,114,233 B2 | 2/2012 | Stanjek |
| 2007/0100111 A1 | 5/2007 | Stanjek et al. |
| 2010/0078117 A1* | 4/2010 | Stanjek .................. C08G 18/10 156/79 |
| 2012/0165493 A1* | 6/2012 | Stanjek ................ C08G 65/336 528/17 |

FOREIGN PATENT DOCUMENTS

| | | |
|---|---|---|
| DE | 102006054155 A1 | 5/2008 |
| DE | 102009029200 A1 | 3/2011 |
| DE | 102009057600 A1 | 6/2011 |
| EP | 2583988 A1 | 4/2013 |
| WO | 02090411 A1 | 11/2002 |
| WO | 2005000931 A1 | 1/2005 |
| WO | 2011026658 A1 | 3/2011 |

* cited by examiner

*Primary Examiner* — Daniel Lee
(74) *Attorney, Agent, or Firm* — Brooks Kushman P.C.

(57) ABSTRACT

Adhesives having high tensile strength are prepared from moisture-curable alkoxysilyl-terminated polyurethanes.

9 Claims, No Drawings

CROSS-LINKABLE MASSES BASED ON ORGANYL-OXYSILANE-TERMINATED POLYURETHANES

CROSS-REFERENCE TO RELATED APPLICATIONS

This application is the U.S. National Phase of PCT Appln. No. PCT/EP2012/072708 filed Nov. 15, 2012, which claims priority to German Application No. 10 2011 087 603.0 filed Dec. 1, 2011, the disclosures of which are incorporated in their entirety by reference herein.

BACKGROUND OF THE INVENTION

1. Field of the Invention

The invention relates to crosslinkable compositions based on silane-terminated polyurethanes, to processes for preparing them, and to their use as adhesives and sealants, especially as adhesives possessing high tensile shear strength.

2. Description of the Related Art

In adhesives applications which call for high tensile shear strengths from the cured adhesives, isocyanate-crosslinking PU adhesives are typically employed. These adhesives customarily comprise isocyanate-functional polyurethane polymers based on aromatic polyisocyanates. Such systems cure through a reaction of the isocyanate groups with (atmospheric) moisture.

Since PU adhesives cure via a chemical crosslinking reaction and at the same time are also able to attach via chemical bonds to numerous substrates (e.g., wood, metals, ceramic substrates, glass, etc.), they usually exhibit very good mechanical properties and are also relatively resistant in the face of external (weathering) effects such as moisture or direct water contact.

Isocyanate-crosslinking adhesives do, however, also possess a number of disadvantages inherent to these systems, some of these disadvantages being substantial. For example, one-component PU adhesive systems display cure rates that are generally no more than moderate. The isocyanate crosslinking can indeed in principle be accelerated sharply by appropriate catalysis. However, since such catalysis is able in principle to catalyze unwanted side-reactions of the isocyanate groups as well (e.g., formation of allophanates, uretdiones, isocyanurates, etc.), the corresponding systems then lack a sufficient shelflife.

Another disadvantage of the majority of isocyanate-crosslinking adhesives is the health-related classification, which ranges from sensitizing to toxic. A critical factor here, in particular, is the amount of monomeric isocyanates which remain in the uncured adhesive, and which are removable only with difficulty. This presents problems for the end user, i.e., the craftworker or do-it-yourself user, who comes into contact not only with the fully cured and hence isocyanate-free and entirely unobjectionable product, but also with the as yet uncured and hence still isocyanate-containing adhesive and/or with the monomeric isocyanates present in this adhesive. For the unpracticed home improver there is a particular risk here that the products may not be used expertly and/or properly. Additional hazards arise here from incorrect storage, such as storage within the reach of children, for example. With the professional craftworker, on the other hand, largely proper use and storage can be assumed. Here, however, the problem usually exists that the professional user is required very regularly indeed—possibly even a number of times a day—to work with the isocyanate-containing material, something which is potentially critical in view in particular of the aforementioned sensitizing and also possibly carcinogenic effects of isocyanates.

Somewhat more favorable in this respect are isocyanate-crosslinking adhesives which contain only very low levels of volatile isocyanates and which are therefore at least free from labeling requirements. These adhesives, however, are mostly based on aliphatic isocyanates, which in turn are less reactive. For applications where rapid setting of the adhesive is a factor, therefore, these adhesives are even more unfavorable than conventional PU adhesives.

An alternative curing technology which is finding application increasingly in the adhesives sector is that of silane crosslinking, where alkoxysilane-functional prepolymers, on contact with atmospheric moisture, initially undergo hydrolysis and then cure through a condensation reaction. The corresponding silane-functional—usually silane-terminated—prepolymers are entirely unobjectionable from the toxicological standpoint, in general.

Polymer systems which possess reactive alkoxysilyl groups have been known for a long time. On contact with water or atmospheric moisture, these alkoxysilane-terminated polymers are capable even at room temperature of undergoing condensation with one another, with elimination of the alkoxy groups. Thus adhesives based on alkoxysilane-crosslinking polymers, in the fully cured state, exhibit not only good properties of adhesion to a number of substrates, but also very good mechanical properties, since on the one hand they exhibit a certain tensile strength and on the other hand they may be highly elastic. The materials in question, accordingly, are suitable especially for sealants and also for elastic adhesives with moderate tensile shear strength.

Preference here is given in numerous applications to one-component systems (1K systems), which cure on contact with atmospheric moisture. The crucial advantages of one-component systems include in particular their very great ease of application, since in this case there is no need for the user to mix a variety of adhesive components. In addition to the time/work saving and the reliable avoidance of possible metering errors, there is also no need with one-component systems to process the adhesive/sealant within a usually decidedly narrow time window, as is the case with multicomponent systems after mixing of the two components has taken place.

Corresponding alkoxysilane-terminated prepolymers have been prior art for some time and are available commercially, for example, under the trade names GENIOSL STP-E (from Wacker-Chemie AG), MS-Polymer (from Kaneka), DESMOSEAL (from Bayer AG), or SPUR (from Momentive).

A disadvantage of the majority of common silane-crosslinking systems, however, is the fact that while moderate tensile shear strengths are achievable, situated typically within an order of magnitude of 1-4 MPa, tensile shear strengths >5 MPa are unachievable or are achievable at best only in very unusual formulations. These unusual formulations, however, have other restrictions in turn, an example being a black coloration owing to the use of carbon black filler, as described in WO 02/090411, for example. Moreover, even with the formulations described in WO 02/090411, it is impossible to achieve tensile strengths >6.5 MPa.

Another way of boosting the tensile strength of silane-crosslinking systems is to incorporate short-chain diols into silane-crosslinking polyurethanes, as is described in WO 05/000931. Even with this measure, though, systems with only moderately improved tensile strengths are achievable. In applications demanding very high tensile shear strengths, therefore, it is usually not possible to employ conventional silane-crosslinking adhesives.

One of the few exceptions are silane-crosslinking systems of the kind described in WO2011/026658. In that case, very high tensile shear strengths, of up to 16 MPa, are achieved through the use of silane-terminated polyurethanes which are based on extremely short-chain polyols. One result of this is that the silane-crosslinking polymers produced have a very high density of urethane units and/or urea units that are capable of hydrogen bonding, and another is that these polymers are relatively short-chain and thus have a correspondingly high number of crosslinkable silane end groups. Inevitably however, such systems possess two inherent disadvantages. First of all, the preparation of prepolymers with a high concentration of silane-crosslinking groups necessitates correspondingly large quantities of silanes. In general, however, these silanes represent the most costly prepolymer constituents, and this raises the raw materials costs of these products accordingly. Secondly, the high concentration of urethane and/or urea groups, which is likewise necessary in order to achieve high tensile shear strengths, leads to very high prepolymer viscosities. Correspondingly problematic is the compounding of these prepolymers into fully formulated adhesives, and also the application of these end products, which usually likewise are of comparatively high viscosity.

SUMMARY OF THE INVENTION

The invention provides mixtures (A) comprising at least two different compounds of the formula

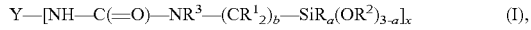

$$Y\text{—}[NH\text{—}C(\!\!=\!\!O)\text{—}NR^3\text{—}(CR^1{}_2)_b\text{—}SiR_a(OR^2)_{3-a}]_x \quad (I),$$

where
Y is an x-valent organic radical,
R³ may be identical or different and is hydrogen atom, a monovalent, optionally substituted, SiC-bonded hydrocarbon radical, a group —(CR¹₂)_b—SiR_a(OR²)_{3-a} or a group —CH(COOR')—CH₂—COOR',
R' may be identical or different and is a monovalent, optionally substituted hydrocarbon radical,
R may be identical or different and is a monovalent, optionally substituted, SiC-bonded hydrocarbon radical,
R¹ may be identical or different and is hydrogen atom or a monovalent, optionally substituted hydrocarbon radical, which may be attached to the carbon atom via nitrogen, phosphorus, oxygen, sulfur, or carbonyl group,
R² may be identical or different and is hydrogen atom or a monovalent, optionally substituted hydrocarbon radical,
x is an integer from 1 to 10, preferably 1, 2, 3, or 4, more preferably 2 or 3, more particularly 2,
a may be identical or different and is 0, 1, or 2, preferably 0 or 1, and
b may be identical or different and is an integer from 1 to 10, preferably 1, 3, or 4, more preferably 1 or 3,
with the provisos that some of the radicals Y contain at least one urethane group and/or urea group and also at least one polyether group and/or polyester group,
and that more than 50% of all the urethane groups and urea groups which are present in the compounds of the formula (I) in the mixture (A) are urea groups which are part of an end group of the formula

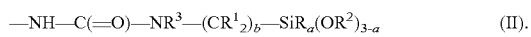

$$\text{—}NH\text{—}C(\!\!=\!\!O)\text{—}NR^3\text{—}(CR^1{}_2)_b\text{—}SiR_a(OR^2)_{3-a} \quad (II).$$

Preferably at least 55%, more preferably at least 60%, more particularly at least 65% of all urethane groups and urea groups which are present in the compounds of the formula (I) included in the mixture (A) of the invention are urea groups which are part of an end group of the formula (II).

In an especially advantageous embodiment of the invention, at least 70% of all urethane groups and urea groups which are present in the compounds of the formula (I) included in the mixture (A) of the invention are urea groups which are part of an end group of the formula (II).

The mixtures (A) of the invention are preferably mixtures comprising compounds (A1) of the formula

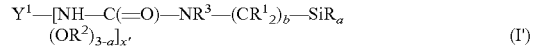

$$Y^1\text{—}[NH\text{—}C(\!\!=\!\!O)\text{—}NR^3\text{—}(CR^1{}_2)_b\text{—}SiR_a(OR^2)_{3-a}]_{x'} \quad (I'),$$

and compounds (A2) of the formula

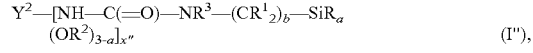

$$Y^2\text{—}[NH\text{—}C(\!\!=\!\!O)\text{—}NR^3\text{—}(CR^1{}_2)_b\text{—}SiR_a(OR^2)_{3-a}]_{x''} \quad (I''),$$

where
Y¹ is an x'-valent organic radical which comprises at least one urethane group and/or urea group and at least one polyether unit and/or polyester unit, and also at least one group Y²,
Y² is an x''-valent, optionally substituted hydrocarbon radical having 2 to 40 carbon atoms, an N,N,N-trialkyl-substituted isocyanurate ring, or an N,N,N-triaryl-substituted isocyanurate ring, which is free from urethane, urea, polyether, and polyester groups,
x' and x'' each independently of one another have the definition of x as reported for formula (I), and R, R¹, R², R³, a, and b have one of the definitions indicated in formula (I), with the proviso that more than 50% of all the urethane groups and urea groups which are present in the compounds of the formula (I') and (I'') in the mixture (A) are urea groups which are part of an end group of the formula

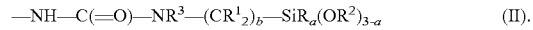

$$\text{—}NH\text{—}C(\!\!=\!\!O)\text{—}NR^3\text{—}(CR^1{}_2)_b\text{—}SiR_a(OR^2)_{3-a} \quad (II).$$

The mixture (A) of the invention preferably comprises less than 10 wt %, more preferably less than 5 wt %, more particularly less than 1 wt % of compounds of the formula (I) which do not conform to one of the formulae (I') or (I''), based in each case on the overall mass of all compounds of the formula (I) in the mixture (A).

In one particular embodiment of the invention, the mixture (A) contains no compounds of the formula (I) which do not conform to one of the formulae (I') or (I'').

The mixture (A) of the invention preferably comprises 10 to 90 mol %, more preferably 25 to 90 mol %, more particularly 50 to 80 mol %, of compounds of the formula (I''), based in each case on the sum total of compounds of the formulae (I') and (I'') in the mixture (A).

The mixture (A) of the invention may comprise in each case only one kind of compound of the formulae (I') and (I''), or else mixtures of different kinds of compounds of the formulae (I') and (I''). In that case the mixture (A) may comprise exclusively compounds of the formulae (I') and (I'') in which more than 90%, preferably more than 95%, more preferably more than 98% of all silyl groups bonded to the radical Y¹ or Y², respectively, are identical. Alternatively the mixture (A) in question may be one comprising, at least in part, compounds of the formulae (I') and (I'') for which different silyl groups are bonded to a radical Y¹ or Y² respectively. Lastly, mixture (A) may also comprise mixtures of different compounds of the formulae (I') and (I'') in which there is a total of at least two different kinds of silyl groups present, but where all silyl groups attached in each case to a radical Y¹ or Y², respectively, are preferably identical.

If mixture (A) comprises different kinds of compounds of the formulae (I') and (I''), then preferred mixtures are those possessing not only compounds having end groups of the formula (II) with b=1 but also compounds having end groups of the formula (II) with b=3. In one particular embodiment of the invention, the mixtures involved are those which possess not only compounds having end groups of formula (II) with b=1 and a=0 or 1, but also compounds having end groups of the formula (II) with b=3 and a=0.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, isooctyl radicals, and 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as o-, m-, p-tolyl radicals, xylyl radicals and ethylphenyl radicals; and aralkyl radicals, such as the benzyl radical, and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical, and the heptafluoroisopropyl radical, and haloaryl radicals such as the o-, m-, and p-chlorophenyl radical.

Radical R preferably comprises monovalent hydrocarbon radicals which are optionally substituted by halogen atoms and which have 1 to 6 carbon atoms, more preferably alkyl radicals having 1 or 2 carbon atoms, more particularly the methyl radical.

Examples of radicals $R^1$ are hydrogen atom, the radicals specified for R, and also optionally substituted hydrocarbon radicals which are bonded to the carbon atom via nitrogen, phosphorus, oxygen, sulfur, carbon, or carbonyl groups. Preferably radicals $R^1$ are hydrogen or hydrocarbon radicals having 1 to 20 carbon atoms, more particularly hydrogen.

Examples of radical $R^2$ are hydrogen and the examples specified for radical R. Radical $R^2$ preferably comprises hydrogen atom or alkyl radicals which are optionally substituted by halogen atoms and which have 1 to 10 carbon atoms, more preferably alkyl radicals having 1 to 4 carbon atoms, more particularly the methyl and ethyl radical.

Radical $R^3$ preferably comprises a group —CH(COOR')—CH$_2$—COOR', a group —(CR$^1{}_2$)$_b$—SiR$_a$(OR$^2$)$_{3-a}$, with R, R', $R^1$, $R^2$, a, and b being one of the definitions indicated in formula (I) or being an optionally substituted hydrocarbon radical having 1 to 20 carbon atoms, more preferably a linear, branched, or cyclic alkyl group having 1 to 20 carbon atoms, or an aryl group which is optionally substituted by halogen atoms and which has 6 to 20 carbon atoms, more particularly a linear, branched or cyclic alkyl group having 1 to 8 carbon atoms. The radicals R' are preferably alkyl groups having 1 to 10 carbon atoms, more preferably methyl, ethyl, or propyl radicals.

Examples of radicals $R^3$ as optionally substituted hydrocarbon radicals are the radicals specified for R, more particularly cyclohexyl, cyclopentyl, n- and isopropyl, n-butyl, isobutyl, and t-butyl, the various stereoisomers of the pentyl radical, hexyl radical, or heptyl radical, and also the phenyl radical.

Radical $Y^1$ preferably comprises radicals composed of at least two urethane groups and/or urea groups, at least one polyether unit and/or polyester unit, at least two groups $Y^2$, and also, optionally, further molecular building blocks. The polyether and/or polyester units are preferably linked to the groups $Y^2$ via urethane groups and/or urea groups, and the end groups of the formula (II) are preferably bonded to the groups $Y^2$.

With particular preference, $Y^1$ is composed of at least two urethane groups, at least one polyether unit and/or polyester unit, at least two groups $Y^2$, and also, optionally, further molecular building blocks.

The radicals $Y^1$ preferably consist, on average, of at least 70 wt %, more preferably at least 80 wt %, and more particularly at least 90 wt %, of urethane groups, groups $Y^2$, and polyether units and/or polyester units, based in each case on the average total weight of all radicals $Y^1$.

In one particular embodiment of the invention, the radicals $Y^1$ consist exclusively of urethane groups, groups $Y^2$, and polyether and/or polyester units.

The polyether and/or polyester building blocks present in the groups $Y^1$ are preferably branched and/or unbranched polyether or polyester building blocks having an average molar mass $M_n$ (number average) of 200 to 24,000 g/mol. Polyether building blocks are preferred in this context. They preferably have an average molar mass $M_n$ of 900 to 9000 g/mol, more particularly of 1900 to 6100 g/mol. They preferably have no branching site or one branching site.

The number-average molar mass $M_n$ is determined by means of Size Exclusion Chromatography (SEC) against polystyrene standard, in THF, at 60° C., flow rate 1.2 ml/min and detection with RI (refractive index detector) on a Styragel HR3-HR4-HR5-HR5 column set from Waters Corp. USA, with an injection volume of 100 μl.

With particular preference, the polyether building blocks present in the groups $Y^1$ correspond to the formula

$$—(R^4—O)_n R^4— \qquad (III),$$

where $R^4$ may be identical or different and is an optionally substituted alkylene radical having 2 to 10 carbon atoms, and n is an integer, with the proviso that n on average has a size such that the polyether units have an average molar mass $M_n$ of 200 to 24,000 g/mol.

$R^4$ preferably comprises alkylene radicals having 2 to 4 carbon atoms, more preferably groups of the formulae —CH$_2$—CH$_2$—, —CH(CH$_3$)—CH$_2$—, and —CH$_2$—CH(CH$_3$)—, more particularly —CH(CH$_3$)—CH$_2$— and —CH$_2$—CH(CH$_3$)—.

The radicals $Y^2$ are preferably optionally substituted hydrocarbon radicals having 4 to 30 carbon atoms, an N,N,N-trialkyl-substituted isocyanurate radical, or an N,N,N-triaryl-substituted isocyanurate radical, more preferably hydrocarbon radicals having 6 to 20 carbon atoms, yet more preferably aromatic hydrocarbon radicals having 6 to 20 carbon atoms, and more particularly a divalent tolyl radical or a divalent diphenylmethane radical.

Examples of radicals $Y^2$ are the divalent isophorone radical, 1,6-hexyl radical, 2,4- or 2,6-tolyl radicals, and also 4,4'- or 2,4' diphenylmethane radicals, with the aromatic radicals being preferred.

The mixture (A) of the invention may be prepared in any desired way, as for example by mixing of different compounds of the formula (I).

The mixture (A) of the invention is preferably preparable by reaction of polyols, di- and/or polyisocyanates, and aminosilanes.

The invention further provides mixtures (A) preparable by reacting
(a) at least one polyol,
(b) at least one di- and/or polyisocyanate, and
(c) at least one aminosilane of the formula

$$HNR^3\text{—}(CR^1{}_2)_b\text{—}SiR_a(OR^2)_{3-a} \quad (IV)$$

and/or its partial hydrolysates,
where R, $R^1$, $R^2$, $R^3$, a, and b have one of the definitions indicated in formula (I),
and also, optionally, further components,
with the proviso that components (a), (b), and (c) and also any further components are used in a ratio whereby for each mole of isocyanate groups in component (b) and also further isocyanate-functional components optionally present in the reaction mixture there is more than 0.5 mol up to a maximum of 0.95 mol of amino groups in component (c) and they are reacted with the isocyanate groups.

The invention further provides a process for preparing the mixtures (A) by reacting
(a) at least one polyol,
(b) at least one di- and/or polyisocyanate, and
(c) at least one aminosilane of the formula

$$HNR^3\text{—}(CR^1{}_2)_b\text{—}SiR_a(OR^2)_{3-a} \quad (IV)$$

and/or its partial hydrolysates,
where R, $R^1$, $R^2$, $R^3$, a, and b have one of the definitions indicated in formula (I),
and also, optionally, further components,
with the proviso that components (a), (b), and (c) and also any further components are used in a ratio whereby for each mole of isocyanate groups in component (b) and also further isocyanate-functional components optionally present in the reaction mixture there is more than 0.5 mol up to a maximum of 0.95 mol of amino groups in component (c) and they are reacted with the isocyanate groups.

The polyols (a) used in accordance with the invention are preferably branched or unbranched polyether polyols or polyester polyols, more preferably polyether polyols, yet more preferably polypropylene glycols, more particularly unbranched polypropylene glycols or polypropylene glycols having a branching site.

The polyols (a) used in accordance with the invention preferably have an average molar mass $M_n$ of 200 to 24,000 g/mol, more preferably 400 to 10,000 g/mol, more particularly 900 to 9000 g/mol.

As component (a) it is also possible to use mixtures of unbranched and singly branched polyols.

In one particularly advantageous embodiment of the invention, polypropylene glycols having an average molar mass $M_n$ of 1900 to 6100 g/mol are used as polyol (a). They are preferably unbranched.

Polyols (a) used in accordance with the invention are commercial products and/or preparable by methods common within chemistry.

Examples of component (b) used in accordance with the invention are all common di- or polyisocyanates, such as, for example, diisocyanatodiphenylmethane (MDI), not only in the form of crude or technical MDI but also in the form of pure 4,4' and/or 2,4' isomers or mixtures thereof, tolylene diisocyanate (TDI) in the form of its various regioisomers, especially 2,4- and 2,6-TDI, and also mixtures of these regioisomers, diisocyanatonaphthalene (NDI), isophorone diisocyanate (IPDI), and hexamethylene diisocyanate (HDI). Examples of polyisocyanates are polymeric MDI (P-MDI), triphenylmethane triisocanate or else dimers or trimers (biurets or isocyanurates) of the abovementioned diisocyanates. Mixtures of different di- and/or polyisocyanates can also be used.

Component (b) preferably comprises aromatic di- or polyisocyanates, more preferably all aforementioned types and derivatives of diisocyanatodiphenylmethane (MDI) and of tolylene diisocyanate (TDI).

Isocyanates (b) used in accordance with the invention are commercial products and/or preparable by methods common within chemistry.

In accordance with the invention, polyol (a) is preferably used in amounts such that for each mole of NCO groups of component (b) and also of further NCO-containing components optionally present in the reaction mixture, at least 0.1 mol, more preferably at least 0.2 mol, more particularly at least 0.25 mol, of hydroxyl groups of component (a) is used.

In accordance with the invention, polyol (a) is used preferably in amounts such that for each mole of NCO groups of component (b) and also of further NCO-containing components optionally present in the reaction mixture, not more than 0.45 mol, more preferably not more than 0.40 mol, more particularly not more than 0.35 mol, of hydroxyl groups of component (a) is used.

Component (c) preferably comprises $HN[(CH_2)_3\text{—}Si(OCH_3)_3]_2$, $HN[(CH_2)_3\text{—}Si(OC_2H_5)_3]_2$, $HN[(CH_2)_3\text{—}Si(OCH_3)_2CH_3]_2$, $HN[(CH_2)_3\text{—}Si(OC_2H_5)_2CH_3]_2$, $HN[(CH_2)\text{—}Si(OCH_3)_3]_2$, $HN[(CH_2)\text{—}Si(OC_2H_5)_3]_2$, $HN[(CH_2)\text{—}Si(OCH_3)_2CH_3]_2$, $HN[(CH_2)\text{—}Si(OC_2H_5)_2CH_3]_2$, cyclo-$C_6H_{11}NH(CH_2)_3\text{—}Si(OCH_3)_3$, cyclo-$C_6H_{11}NH(CH_2)_3\text{—}Si(OC_2H_5)_3$, cyclo-$C_6H_{11}NH(CH_2)_3\text{—}Si(OCH_3)_2CH_3$, cyclo-$C_6H_{11}NH(CH_2)_3\text{—}Si(OC_2H_5)_2CH_3$, cyclo-$C_6H_{11}NH(CH_2)\text{—}Si(OCH_3)_3$, cyclo-$C_6H_{11}NH(CH_2)\text{—}Si(OC_2H_5)_3$, cyclo-$C_6H_{11}NH(CH_2)\text{—}Si(OCH_3)_2CH_3$, cyclo-$C_6H_{11}NH(CH_2)\text{—}Si(OC_2H_5)_2CH_3$, phenyl-$NH(CH_2)_3\text{—}Si(OCH_3)_3$, phenyl-$NH(CH_2)_3\text{—}Si(OC_2H_5)_3$, phenyl-$NH(CH_2)_3\text{—}Si(OCH_3)_2CH_3$, phenyl-$NH(CH_2)_3\text{—}Si(OC_2H_5)_2CH_3$, phenyl-$NH(CH_2)\text{—}Si(OCH_3)_3$, phenyl-$NH(CH_2)\text{—}Si(OC_2H_5)_3$, phenyl-$NH(CH_2)\text{—}Si(OCH_3)_2CH_3$, phenyl-$NH(CH_2)\text{—}Si(OC_2H_5)_2CH_3$, and also alkyl-$NH(CH_2)_3\text{—}Si(OCH_3)_3$, alkyl-$NH(CH_2)_3\text{—}Si(OC_2H_5)_3$, alkyl-$NH(CH_2)_3\text{—}Si(OCH_3)_2CH_3$, alkyl-$NH(CH_2)_3\text{—}Si(OC_2H_5)_2CH_3$, alkyl-$NH(CH_2)\text{—}Si(OCH_3)_3$, alkyl-$NH(CH_2)\text{—}Si(OC_2H_5)_3$, alkyl-$NH(CH_2)\text{—}Si(OCH_3)_2CH_3$, and alkyl-$NH(CH_2)\text{—}Si(OC_2H_5)_2CH_3$ and their partial hydrolysates, more preferably cyclo-$C_6H_{11}NH(CH_2)_3\text{—}Si(OC_2H_5)_3$, cyclo-$C_6H_{11}NH(CH_2)_3\text{—}Si(OCH_3)_2CH_3$, cyclo-$C_6H_{11}NH(CH_2)_3\text{—}Si(OC_2H_5)_2CH_3$, cyclo-$C_6H_{11}NH(CH_2)\text{—}Si(OCH_3)_3$, cyclo-$C_6H_{11}NH(CH_2)\text{—}Si(OC_2H_5)_3$, cyclo-$C_6H_{11}NH(CH_2)\text{—}Si(OCH_3)_2CH_3$, cyclo-$C_6H_{11}NH(CH_2)\text{—}Si(OC_2H_5)_2CH_3$, phenyl-$NH(CH_2)_3\text{—}Si(OCH_3)_3$, phenyl-$NH(CH_2)_3\text{—}Si(OC_2H_5)_3$, phenyl-$NH(CH_2)_3\text{—}Si(OCH_3)_2CH_3$, phenyl-$NH(CH_2)_3\text{—}Si(OC_2H_5)_2CH_3$, phenyl-$NH(CH_2)\text{—}Si(OCH_3)_3$, phenyl-$NH(CH_2)\text{—}Si(OC_2H_5)_3$, phenyl-$NH(CH_2)\text{—}Si(OCH_3)_2CH_3$, phenyl-$NH(CH_2)\text{—}Si(OC_2H_5)_2CH_3$, and also alkyl-$NH(CH_2)_3\text{—}Si(OCH_3)_3$, alkyl-$NH(CH_2)_3\text{—}Si(OC_2H_5)_3$, alkyl-$NH(CH_2)_3\text{—}Si(OCH_3)_2CH_3$, alkyl-$NH(CH_2)_3\text{—}Si(OC_2H_5)_2CH_3$, alkyl-$NH(CH_2)\text{—}Si(OCH_3)_3$, alkyl-$NH(CH_2)\text{—}Si(OC_2H_5)_3$, alkyl-$NH(CH_2)\text{—}Si(OCH_3)_2CH_3$, and alkyl-$NH(CH_2)\text{—}Si(OC_2H_5)_2CH_3$ and their partial hydrolysates, where "alkyl" stands preferably for ethyl, n-propyl, isopropyl, n-butyl, isobutyl, t-butyl, and also the various stereoisomers of the pentyl, hexyl, heptyl, or octyl radical.

In accordance with the invention, component (c) is preferably used in amounts such that for each mole of isocyanate groups of component (b) and also of further isocyanate-functional components optionally present in the reaction mixture there is at least 0.55 mol, more preferably at least 0.60 mol, more particularly at least 0.65 mol, of amine groups of component (c) that are used and are reacted with the isocyanate groups.

In accordance with the invention component (c) is used preferably in amounts such that for each mole of NCO groups of component (b) and also of further NCO-containing components optionally present in the reaction mixture there is not more than 0.90 mol, more preferably not more than 0.85 mol, more particularly not more than 0.75 mol of amine groups of component (c) that are used.

The further components employed optionally may be isocyanate-reactive compounds (d) different from components (a) and (c); monoisocyanates (e); and catalysts (f).

Examples of optionally employed component (d) are compounds having one or more NH, OH, or SH functions.

As optionally employed component (d) it is possible for example to use monomeric alcohols, such as methanol, ethanol, or butanol, preferably alcohols having at least 6 carbon atoms, more preferably alcohols having at least 8 carbon atoms, more particularly having at least 10 carbon atoms, with the alcohols (d) preferably possessing linear or branched alkyl radicals. These alcohols react likewise with the di- or polyisocyanates (b). The results are compounds analogous to formula (I), with their chain ends not exclusively silane-terminated, instead also possessing a certain fraction of urethane-bonded alkyl end groups.

As component (d) it is also possible, furthermore, to use monomeric alcohols having 2 to 4 hydroxyl groups, preferably 2 hydroxyl groups, such as, for example, glycol, propanediol, glycerol, and pentaerythritol, with particular preference being given to 1,4-butanediol or dimer diol, such as Pripol 2033 from Croda, for example.

If component (d) is used, the amounts involved are preferably such that for each mole of NCO groups of component (b) and also of further NCO-containing components optionally present in the reaction mixture there is at most 0.20 mol, more preferably at most 0.1 mol, of NCO-reactive groups of component (d) used. Preferably no component (d) is used in preparing the mixture (A) of the invention.

As further components it is possible in accordance with the invention to use compounds having one isocyanate group (e), such as butyl isocyanate, cyclohexyl isocyanate, or phenyl isocyanate, for example.

If component (e) is used, the amounts involved are preferably such that for each mole of NCO groups of component (b) there is at most 0.20 mol, more preferably at most 0.1 mol, more particularly 0.05 mol, of NCO groups of component (e) used. Preferably no component (e) is used in preparing the mixture (A) of the invention.

The preparation of the mixtures (A) in accordance with the invention may take place in the presence of a catalyst (f), this being preferred.

Examples of optionally employed catalysts (f) are bismuth-containing catalysts, such as Borchi® Kat 22, Borchi® Kat VP 0243, and Borchi® Kat VP 0244 from Borchers GmbH, for example, and also the compounds described below as curing catalysts (F).

If catalysts (f) are used in preparing the mixtures (A), the amounts involved are preferably 0.001 to 5 parts by weight, more particularly 0.05 to 1 part by weight, based in each case on 100 parts by weight of mixture (A).

In one preferred embodiment of the invention, the mixture (A) has been prepared from reactants which consist to an extent of at least 80 wt %, more preferably at least 90 wt %, more particularly at least 95 wt %, and most preferably 100%, of components (a), (b), and (c), in each case based on the total weight of all components (a) to (e).

The process of the invention preferably uses no constituents beyond the components (a), (b), (c), optionally (d), optionally (e), and optionally (f).

In the process of the invention the components (a), (b), and (c) and also any further components are employed in a ratio whereby there are preferably 0.6 to 1.4, more preferably 0.8 to 1.2, isocyanate-reactive groups to 1 isocyanate group.

The components employed in the process of the invention may in each case be one kind of such a component, or else a mixture of at least two kinds of a respective component.

In the case of the preparation of the mixture (A) in accordance with the invention, preferably first either the entire isocyanate component (b) or else the entire polyol component (a) is introduced initially, after which the other component, (a) or (b) respectively, is added, and the two components are allowed to react with one another. Subsequently, from the resultant isocyanate-functional intermediate, the end product is produced by reaction with the silane component (c). The individual reaction steps may optionally take place in the presence of a catalyst. If additionally one or more components (d) and/or (e) are used, they may be added in principle at any desired point in time to the reaction mixture. Preferably, however, any monoisocyanate compounds (e) to be used are employed together with component (b), and any further isocyanate-reactive compounds (d) to be used are added preferably jointly or else directly before or after component (a) to the reaction mixture.

Besides this preferred mode of preparation, however, there are also numerous other conceivable variations of the process of the invention. For instance, the reaction sequence may in principle also be reversed, and a reaction between the isocyanate component (b) and the silane component (c) carried out initially, before the polyol component (a) is added. It is likewise envisionable for the silane component (c) and the polyol component (e) to be added either simultaneously but via separate feedlines to the reaction mixture, or else to be employed jointly as a mixture and reacted with the isocyanate component (b). In the case of these variants of the process as well, any further components (d) and/or (e) may in principle be added at any point in time to the reaction mixture, although there are the same abovementioned preferred combinations of (b) and (e), and of (a) and (d).

With the process of the invention it is also conceivable to add individual components each in portions at two or more different times. Thus, for example, it would be possible first to react the polyol component (a) initially only with a portion of the isocyanate component (b), and for the resulting NCO-functional or OH-functional intermediate, according to stoichiometry, to be reacted only in subsequent reaction steps with the remaining portions of the isocyanate component (b) and also with the silane component (c).

The process of the invention is preferably carried out at temperatures of at least 0° C., more preferably at least 20° C., and preferably not more than 150° C., more particularly not more than 100° C.

The process of the invention is preferably carried out in the absence of (atmospheric) moisture and under the pressure of the surrounding atmosphere, in other words at about 900 to 1100 hPa.

The process of the invention may take place continuously, as for example in a tube reactor having a plurality of metering points situated one alongside another or else one behind another, or may take place discontinuously, as for example in a conventional reaction tank with stirring mechanism.

A further process variant for the preparation of the mixture (A) may of course also be that in which part-components of the mixture (A'), (A"), etc., are first of all prepared and are subsequently mixed with one another. Here it would be possible, for example, first to prepare a part-component (A') comprising the abovementioned components (a), (b), (c), and optionally (d) and/or (e). This part-component (A') may optionally also not yet possess a sufficiently high number of end groups of the formula (II). The part-component (A') may subsequently be mixed with a second part-component (A"), which for example has likewise been prepared from the abovementioned components (a), (b), and (c) and also, optionally, (d) and/or (e), or else only (b) and (c) and also optionally (d) and/or (e), with the resulting mixture (A) then possessing a sufficiently high number of end groups of the formula (II).

Besides compounds of the formula (I), the mixture (A) of the invention or prepared in accordance with the invention may also comprise additional substances, such as unreacted silane radicals and also catalyst (f), for example.

The mixture (A) of the invention is preferably isocyanate-free. This absence of isocyanate may also be achieved when the abovementioned excesses of NCO groups, relative to the NCO-reactive groups, are employed, since the excess NCO groups are also able, for example, to react with urethane units and/or urea units that have formed, with formation of allophanate and/or biuret.

The mixture (A) of the invention preferably has an average molar mass $M_n$ of at least 400 g/mol, more preferably at least 800 g/mol, and preferably not more than 10 000 g/mol, more preferably not more than 8000 g/mol, more particularly not more than 5000 g/mol.

The viscosity of the mixture (A) is preferably at least 1 Pas, more preferably at least 10 Pas, very preferably at least 20 Pas, and preferably not more than 1000 Pas, more preferably not more than 500 Pas, more particularly not more than 200 Pas, in each case measured at 25° C.

The mixtures (A) of the invention and those prepared in accordance with the invention may be employed for all purposes for which silane-terminated polyurethanes are useful.

The mixtures (A) of the invention and those prepared in accordance with the invention are storable in the absence of water and crosslinkable at room temperature on ingress of water, thereby opening up a multiplicity of possible applications. In addition to the compounds of the formula (I) present in the mixture (A), the crosslinkable compositions may comprise all further substances which have also been employed to date in crosslinkable compositions.

The invention further provides crosslinkable compositions (M) comprising (A) at least two different compounds of the formula

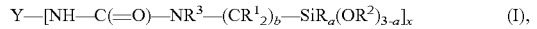
(I), where Y, R, $R^1$, $R^2$, $R^3$, a, b, and x have one of the definitions indicated for them above,
with the provisos that some of the radicals Y contain at least one urethane group and/or urea group and also at least one polyether group and/or polyester group,
and that more than 50% of all the urethane groups and urea groups which are present in the compounds of the formula (I) are urea groups which are part of an end group of the formula

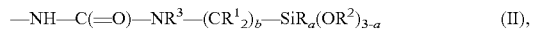
(II), optionally
(B) polymers which do not conform to the formula (I),
(C) basic nitrogen-containing organosilicon compounds, optionally
(D) fillers, optionally
(E) silicone resins, optionally
(F) catalysts, optionally
(G) adhesion promoters, optionally
(H) water scavengers, optionally
(I) nonreactive plasticizers, optionally
(J) additives, and optionally
(K) adjuvants.

Component (A) preferably comprises a component comprising compounds (A1) and (A2).

The compositions (M) of the invention preferably comprise component (A) in concentrations of 50 to 99 wt %, more preferably 60 to 98 wt %, if the compositions in question are transparent. Where the compositions are nontransparent, containing filler, the compositions (M) of the invention comprise component (A) preferably in concentrations of 10 to 70 wt %, more preferably 20 to 60 wt %.

The compositions (M) of the invention are moisture-curing, i.e., comprising preferably liquid or pasty compositions which cure on contact with humidity and/or atmospheric moisture.

In the case of component (B) it is possible to employ all polymers with condensable groups that have become known to date and that do not correspond to the formula (I).

Inventively employed polymers (B) preferably comprise no urea units.

Examples of polymers (B) are alkoxysilane-terminated polyethers (B1). These preferably have average molar masses $M_n$ of 1000 to 50,000 g/mol, more particularly of 8000 to 30,000 g/mol. Such products are commercially available, for example, under the name MS-Polymer® from Kaneka or GENIOSIL® STP-E from Wacker Chemie AG.

The compositions (M) of the invention preferably comprise no silane-crosslinking polymers (B) which are not silane-terminated polyethers (B1).

If the compositions (M) of the invention do comprise silane-crosslinking polyethers (B1), the amounts involved are preferably not more than 50 wt %, more particularly not more than 25 wt %, and not less than 1 wt %, more particularly not less than 5 wt %, based in each case on the weight of the overall composition (M). In one particularly preferred embodiment of the invention, however, the compositions (M) of the invention contain no polymers (B) at all.

The basic nitrogen-containing organosilicon compounds (C) present in the compositions (M) of the invention are preferably organosilicon compounds comprising units of the formula

(VII), in which
$R^5$ may be identical or different and denotes hydrogen atom or optionally substituted hydrocarbon radicals,
D may be identical or different and denotes a monovalent, SiC-bonded radical with basic nitrogen,
$R^6$ may be identical or different and denotes a monovalent, optionally substituted SiC-bonded organic radical free of basic nitrogen, c is 0, 1, 2, 3, or 4, preferably 1,
d is 0, 1, 2, or 3, preferably 1, 2, or 3, more preferably 2 or 3, and
e is 0, 1, 2, or 3, preferably 1 or 0,
with the proviso that the sum of c+d+e is less than or equal to 4 and there is at least one radical D present per molecule.

The organosilicon compounds (C) employed in accordance with the invention may be silanes, i.e., compounds of the formula (VII) with c+d+e=4, and siloxanes, i.e., compounds comprising units of the formula (VII) with c+d+e≤3, and are preferably silanes.

Examples of optionally substituted hydrocarbon radicals $R^5$ are the examples specified for radical R. The radicals $R^5$ are preferably hydrogen or hydrocarbon radicals which are optionally substituted by halogen atoms and which have 1 to 18 carbon atoms, more preferably hydrogen or hydrocarbon radicals which have 1 to 10 carbon atoms, more particularly, methyl or ethyl radicals.

Examples of radical $R^6$ are the examples specified for R. Radical $R^6$ preferably comprises hydrocarbon radicals which are optionally substituted by halogen atoms and which have 1 to 18 carbon atoms, more preferably hydrocarbon radicals which have 1 to 5 carbon atoms, more particularly the methyl radical.

Examples of radicals D are radicals of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N$—$CH_2$—$CH(CH3)$-$CH_2$—, $H_2N(CH_2)_5$—, cyclo-$C_5H_9NH(CH_2)_3$—, cyclo-$C_6H_{11}NH(CH_2)_3$—, phenyl-$NH(CH_2)_3$, $(CH_3)_2N(CH_2)_3$—, $(C_2H_5)_2N(CH_2)_3$—, $(C_3H_7)_2NH(CH_2)_3$—, $(C_4H_9)_2NH(CH_2)_3$—, $(C_5H_{11})_2NH(CH_2)_3$—, $(C_6H_{13})_2NH(CH_2)_3$—, $(C_7H_{15})_2NH(CH_2)_3$—, $H_2N(CH_2)$—, $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-$NH(CH_2)$—, $(CH_3)_2N(CH_2)$—, $(C_2H_5)_2N(CH_2)$—, $(C_3H_7)_2NH(CH_2)$—, $(C_4H_9)_2NH(CH_2)$—, $(C_5H_{11})_2NH(CH_2)$—, $(C_6H_{13})_2NH(CH_2)$—, $(C_7H_{15})_2NH(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$—, and $(C_2H_5O)_2(CH_3)Si(CH_2)_3NH(CH_2)_3$—, and also reaction products of the abovementioned primary amino groups with compounds which comprise epoxide groups or double bonds that are reactive toward primary amino groups.

Radical D preferably comprises the $H_2N(CH_2)_3$—, $H_2N(CH_2)_2NH(CH_2)_3$—, or cyclo-$C_6H_{11}NH(CH_2)_3$— radicals.

Examples of the silanes of the formula (VII) used in accordance with the invention are all silanes already stated as examples of component (c), and also their partial hydrolysates, and also $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3$—$Si(OCH_3)_3$, $H_2N(CH_2)_2NH(CH_2)_2NH(CH_2)_3$—$Si(OC_2H_5)_3$, and also their partial hydrolysates, with preference being given to $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OC_2H_5)_3$, and cyclo-$C_6H_{11}NH(CH_2)_3$—$Si(OCH_3)_2CH_3$ and also in each case their partial hydrolysates, and particular preference to $H_2N(CH_2)_2NH(CH_2)_3$—$Si(OCH_3)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OCH_3)_2CH_3$ and also in each case their partial hydrolysates.

In the compositions (M) of the invention, the organosilicon compounds (C) used in accordance with the invention may also take on the function of a curing catalyst or curing cocatalyst.

Furthermore, the organosilicon compounds (C) used in accordance with the invention may act as adhesion promoters and/or as water scavengers.

The organosilicon compounds (C) used in accordance with the invention are commercial products and/or can be prepared by methods that are commonplace within chemistry.

The compositions (M) of the invention preferably comprise component (C) in amounts of 0.01 to 25 parts by weight, more preferably 0.1 to 10 parts by weight, more particularly 0.5 to 5 parts by weight, in each case based on 100 parts by weight of component (A).

The fillers (D) optionally employed in the compositions (M) of the invention may be any desired fillers known to date. Examples of fillers (D) are nonreinforcing fillers, these being fillers having a BET surface area of preferably up to 50 m²/g, such as quartz, diatomaceous earth, calcium silicate, zirconium silicate, talc, kaolin, zeolites, metal oxide powders, such as aluminum oxides, titanium oxides, iron oxides, or zinc oxides, and/or their mixed oxides, barium sulfate, calcium carbonate, gypsum, silicon nitride, silicon carbide, boron nitride, glass powders and polymeric powders, such as polyacrylonitrile powders; reinforcing fillers, these being fillers having a BET surface area of more than 50 m²/g, such as pyrogenically prepared silica, precipitated silica, precipitated chalk, carbon black, such as furnace black and acetylene black, and mixed silicon/aluminum oxides of high BET surface area; aluminum trihydroxide, fillers in the form of hollow beads, such as ceramic microbeads, examples being those obtainable under the trade name Zeeospheres™ from 3M Deutschland GmbH of Neuss, Germany, elastic polymeric beads, of the kind, for instance, obtainable under the trade name EXPANCEL® from AKZO NOBEL, Expancel, of Sundsvall, Sweden, or glass beads; fillers in fiber form, such as asbestos and also polymeric fibers. The stated fillers may have been hydrophobized, by treatment for example with organosilanes and/or organosiloxanes or with stearic acid, or by etherification of hydroxyl groups to alkoxy groups.

The fillers (D) optionally employed are preferably calcium carbonate, talc, aluminum trihydroxide, and silica, particular preference being given to aluminum trihydroxide. Preferred calcium carbonate grades are ground or precipitated and have optionally been surface-treated with fatty acids such as stearic acid or salts thereof. The preferred silica is preferably pyrogenic (fumed) silica.

Fillers (D) optionally employed preferably have a moisture content below 1 wt %, more preferably below 0.5 wt %.

If the compositions (M) of the invention do comprise fillers (D), the amounts in question are preferably 10 to 1000 parts by weight, more preferably 50 to 500 parts by weight, more particularly 70 to 200 parts by weight, based in each case on 100 parts by weight of constituent (A). The compositions (M) of the invention do preferably comprise fillers (D).

In one particular embodiment of the invention, the compositions (M) of the invention comprise as fillers (D) a combination of a) silica, more particularly fumed silica, and b) calcium carbonate, aluminum trihydroxide and/or talc.

The silicone resins (E) employed optionally in the compositions (M) of the invention are preferably compounds comprising units of the formula

$$R^7{}_f(R^8O)_g SiO_{(4-f-g)/2} \quad (VIII),$$

where
R$^7$ may be identical or different and denote hydrogen or a monovalent, SiC-bonded, optionally substituted aliphatic or aromatic hydrocarbon radical,
R$^8$ may be identical or different and denote hydrogen or a monovalent, optionally substituted hydrocarbon radical,
f is 0, 1, 2, or 3, and
g is 0, 1, 2, or 3, preferably 0, 1, or 2, more preferably 0 or 1, with the proviso that the sum of f+g is less than or equal to 3 and in at least 50%, preferably at least 60%, of the units of the formula (VIII), f is 0 or 1.

Preferably at least 90 wt % of component (E) is composed of units of the formula (VIII). With particular preference component (E) consists exclusively of units of the formula (VIII).

Examples of radicals R$^7$ are the examples given above for R. Radical R$^7$ preferably comprises monovalent, SiC-bonded aliphatic or aromatic hydrocarbon radicals having 1 to 18 carbon atoms that are optionally substituted by halogen atoms, with radical R$^7$ more preferably being the methyl or phenyl radical. Preferably at least 40%, more preferably at least 50% of the units of the formula (VIII) have a radical R$^7$ which is a phenyl radical.

Examples of radical R$^8$ are hydrogen or the examples given for radical R. Radical R$^8$ preferably comprises hydrogen or alkyl radicals that are optionally substituted by halogen atoms and have 1 to 10 carbon atoms, more preferably the methyl and ethyl radicals.

Examples of silicone resins which can be employed as component (E) are organopolysiloxane resins which consist substantially, preferably exclusively, of (Q) units of the formulae SiO$_{4/2}$, Si(OR$^8$)O$_{3/2}$, Si(OR$^8$)$_2$O$_{2/2}$, and Si(OR$^8$)$_3$O$_{1/2}$, (T) units of the formulae PhSiO$_{3/2}$, PhSi(OR$^8$)O$_{2/2}$, and PhSi(OR$^8$)$_2$O$_{1/2}$, (D) units of the formulae Me$_2$SiO$_{2/2}$ and Me$_2$Si(OR$^8$)O$_{1/2}$, and (M) units of the formula Me$_3$SiO$_{1/2}$, where Me stands for a methyl radical, Ph for a phenyl radical, and R$^8$ for hydrogen or alkyl radicals optionally substituted by halogen atoms and having 1 to 10 carbon atoms, more preferably hydrogen or alkyl radicals having 1 to 4 carbon atoms, with the resin comprising, for each mole of (T) units, preferably 0-2 mol of (Q) units, 0-2 mol of (D) units, and 0-2 mol of (M) units.

Preferred examples of silicone resins which can be employed as components (E) are organopolysiloxane resins which consist substantially, preferably exclusively, of T units of the formulae PhSiO$_{3/2}$, PhSi(OR$^8$)O$_{2/2}$, and PhSi(OR$^8$)$_2$O$_{1/2}$, optionally T units of the formulae MeSiO$_{3/2}$, MeSi(OR$^8$)O$_{2/2}$, and MeSi(OR$^8$)$_2$O$_{1/2}$, and also optionally D units of the formulae Me$_2$SiO$_{2/2}$ and Me$_2$Si(OR$^8$)O$_{1/2}$, where Me stands for a methyl radical, Ph for a phenyl radical, and R$^8$ for hydrogen or alkyl radicals that are optionally substituted by halogen atoms and have 1 to 10 carbon atoms, more preferably hydrogen or alkyl radicals having 1 to 4 carbon atoms, with a molar ratio of phenylsilicone units to methylsilicone units of 0.5 to 2.0. The amount of D units in these silicone resins is preferably below 10 wt %.

The silicone resins which can be employed as components (E) preferably possess an average molar mass M$_n$ of at least 400 g/mol and more preferably of at least 600 g/mol. The average molar mass M$_n$ is preferably not more than 400,000 g/mol, more preferably not more than 100,000 g/mol, more particularly not more than 50,000 g/mol. They may be liquid or solid at 23° C. and 1000 hPa, with preference being given to liquid silicone resins.

The silicone resins which can be employed as components (E) are commercial products, examples being various SILRES® grades from Wacker Chemie AG, such as SILRES® IC 368, SILRES® IC 678, or SILRES® SY231.

If the compositions (M) of the invention do comprise component (E), the amounts involved are at least 5 parts by weight, more preferably at least 10 parts by weight, more particularly at least 50 parts by weight, and preferably not more than 1000 parts by weight, more preferably not more than 500 parts by weight, more particularly not more than 300 parts by weight, based on 100 parts by weight of the mixture (A).

The catalysts (F) used optionally in the compositions (M) of the invention may be any desired catalysts known to date for compositions that cure by silane condensation.

Examples of metal-containing curing catalysts (F) are organotitanium and organotin compounds, examples being titanic esters such as tetrabutyl titanate, tetrapropyl titanate, tetraisopropyl titanate, and titanium tetraacetylacetonate; tin compounds such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (F) are basic compounds such as triethylamine, tributylamine, 1,4-diazabicyclo[2.2.2]octane, 1,5-diazabicyclo[4.3.0]non-5-ene, 1,8-diazabicyclo[5.4.0]undec-7-ene, N,N-bis(N,N-dimethyl-2-amino-ethyl)methylamine, N,N-dimethylcyclohexylamine, N,N-dimethyl-phenylamine, and N-ethylmorpholinine.

As catalyst (F) it is likewise possible to use acidic compounds, such as phosphoric acid and its esters, toluenesulfonic acid, sulfuric acid, nitric acid, or else organic carboxylic acids, e.g., acetic acid and benzoic acid.

In one embodiment of the invention the optionally employed catalysts (F) are metal-containing curing catalysts, preferably tin-containing catalysts. This embodiment of the invention is especially preferred when component (A) consists wholly or at least partly, in other words to an extent of at least 90 wt %, preferably at least 95 wt %, of compounds of the formula (I) in which b is other than 1.

If the compositions (M) of the invention do comprise catalysts (F), the amounts involved are preferably 0.01 to 20 parts by weight, more preferably 0.05 to 5 parts by weight, based in each case on 100 parts by weight of constituent (A).

The adhesion promoters (G) employed optionally in the compositions (M) of the invention may be any desired adhesion promoters that have been described hitherto for systems that cure by silane condensation.

Examples of adhesion promoters (G) are epoxy silanes, such as glycidyloxypropyltrimethoxysilanes, glycidyloxypropylmethyldi-methoxysilane, glycidyloxypropyltriethoxysilane, or glycidyl-oxypropylmethyldiethoxysilane, 2-(3-triethoxysilylpropyl)maleic anhydride, N-(3-trimethoxysilylpropyl)urea, N-(3-triethoxysilylpropyl)urea, N-(trimethoxysilylmethyl)urea, N-(methyldimethoxysilylmethyl)urea, N-(3-triethoxysilyl-methyl)urea, N-(3-methyldiethoxysilylmethyl)urea, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, 3-methacryloyloxypropyl-trimethoxysilane, methacryloyloxymethyltrimethoxysilane, methacryloyloxymethyl-methyldimethoxysilane, methacryloyloxymethyltriethoxysilane, methacryloyloxymethylmethyldiethoxysilane, 3-acryloyloxypropyltrimethoxysilane, acryloyloxymethyltrimethoxysilane, acryloyloxymethylmethyldimethoxysilanes, acryloyloxymethyltriethoxysilane, and acryloyloxymethylmethyldiethoxysilane, and also their partial condensates.

If the compositions (M) of the invention do comprise adhesion promoters (G), the amounts involved are preferably 0.5 to 30 parts by weight, more preferably 1 to 10 parts by weight, based in each case on 100 parts by weight of component (A).

The water scavengers (H) employed optionally in the compositions (M) of the invention may be any desired water scavengers described for systems that cure by silane condensation.

Examples of water scavengers (H) are silanes such as vinyl-trimethoxysilane, vinyltriethoxysilane, vinylmethyldimethoxysilane, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, and/or their partial condensates, and also orthoesters, such as 1,1,1-trimethoxyethane, 1,1,1-triethoxyethane, tri-methoxymethane, and triethoxymethane.

If the compositions (M) of the invention do comprise water scavengers (H), the amounts involved are preferably 0.5 to 30 parts by weight, more preferably 1 to 20 parts by weight, based in each case on 100 parts by weight of component (A).

The nonreactive plasticizers (I) employed optionally in the compositions (M) of the invention may be any desired plasticizers known to date and typical for silane-crosslinking systems.

Examples of nonreactive plasticizers (I) are phthalic esters (e.g., dioctyl phthalate, diisooctyl phthalate, and diundecyl phthalate), perhydrogenated phthalic esters (e.g., 1,2-cyclohexanedicarboxylic diisononyl esters and 1,2-cyclohexanedicarboxylic dioctyl esters), adipic esters (e.g., dioctyl adipate), benzoic esters, glycol esters, esters of saturated alkanediols (e.g., 2,2,4-trimethyl-1,3-pentanediol monoisobutyrates and 2,2,4-trimethyl-1,3-pentanediol diisobutyrates), phosphoric esters, sulfonic esters, polyesters, polyethers (e.g., polyethylene glycols and polypropylene glycols with molar masses $M_n$ of preferably 400 to 10 000 g/mol), polystyrenes, polybutadienes, polyisobutylenes, paraffinic hydrocarbons, and branched hydrocarbons of high molecular mass.

If the compositions (M) of the invention do comprise nonreactive plasticizers (I), the amounts involved are preferably 0.01 to 100 parts by weight, based on 100 parts by weight of component (A).

Since, however, nonreactive plasticizers (I) significantly reduce hardness and tensile shear strengths in the adhesives preparable from the compositions (M) of the invention, the compositions (M) of the invention preferably comprise less than 10 parts by weight, more preferably less than 5 parts by weight, more particularly less than 2 parts by weight, of nonreactive plasticizers (I), based in each case on 100 parts by weight of component (A).

In one particularly advantageous embodiment of the invention, the compositions (M) of the invention contain no nonreactive plasticizers (I).

The additives (J) employed optionally in the compositions (M) of the invention may be any desired additives known to date and typical for silane-crosslinking systems.

The additives (J) employed optionally in accordance with the invention are preferably antioxidants, UV stabilizers, such as HALS compounds, for example, fungicides, and pigments.

If the compositions (M) of the invention do comprise additives (J), the amounts involved are preferably 0.01 to 30 parts by weight, more preferably 0.1 to 10 parts by weight, based in each case on 100 parts by weight of component (A).

The adjuvants (K) employed optionally in accordance with the invention are preferably tetraalkoxysilanes, as for example tetraethoxysilane and/or partial condensates thereof, reactive plasticizers, rheological additives, flame retardants, and organic solvents.

Preferred reactive plasticizers (K) are compounds which comprise alkyl chains having 6 to 40 carbon atoms, and possess a group which is reactive toward the compounds (A). Examples are isooctyltrimethoxysilane, isooctyltriethoxysilane, N-octyl-trimethoxysilane, N-octyltriethoxysilane, decyltrimethoxysilanes, decyltriethoxysilane, dodecyltrimethoxysilane, dodecyltriethoxysilane, tetradecyltrimethoxysilane, tetradecyltriethoxysilane, hexadecyltrimethoxysilane, and hexadecyltriethoxysilane.

The rheological additives (K) are preferably polyamide waxes, hydrogenated castor oils, or stearates.

Examples of organic solvents (K) are low molecular mass ethers, esters, ketones, aromatic and aliphatic and also optionally halogen-containing hydrocarbons, and alcohols, preferably the latter.

It is preferred for no organic solvents (K) to be added to the compositions (M) of the invention.

If the compositions (M) of the invention do comprise one or more components (K), the amounts involved are in each case preferably 0.5 to 200 parts by weight, more preferably 1 to 100 parts by weight, more particularly 2 to 70 parts by weight, based in each case on 100 parts by weight of component (A).

The compositions (M) of the invention preferably comprise no further constituents other than components (A) to (K).

The components employed in accordance with the invention may in each case comprise one kind of such a component or else a mixture of at least two kinds of a respective component.

The compositions (M) of the invention are preferably formulations having viscosities of 500 to 1,000,000 mPas, more preferably 1000 to 500,000 mPas, and more particularly 5000 to 100,000 mPas, in each case at 25° C.

The compositions (M) of the invention are preferably adhesives or sealants, more preferably adhesives.

The present invention additionally provides a process for producing the compositions (M) of the invention by mixing the individual components in any order.

The compositions (M) of the invention may be produced in any desired way that is known per se, such as, for instance, by methods and mixing techniques of the kind customary for the production of moisture-curing compositions. In this method, component (A) may be used in the form of the above-described mixture of the invention, or as the individual compounds of the formula (I), present in the mixture (A), separately from one another.

This mixing may take place at room temperature, i.e., at temperatures between 0 and 30° C. and under the pressure of the surrounding atmosphere, in other words approximately 900 to 1100 hPa. If desired, however, this mixing may also take place at higher temperatures, as for example at temperatures in the range from 30 to 130° C. It is possible, additionally, to carry out mixing occasionally or continually under reduced pressure, such as at an absolute pressure of 30 to 500 hPa, for example, in order to remove volatile compounds and/or air.

The mixing according to the invention takes place preferably in the absence of moisture.

The process of the invention may be carried out continuously or discontinuously.

The compositions (M) of the invention are preferably one-component compositions which are storable in the absence of water and crosslinkable at room temperature on admittance of water. The compositions (M) of the invention may alternatively be part of two-component crosslinking systems, in which OH-containing compounds, such as water, are added in a second component.

The typical water content of the air is sufficient to crosslink the compositions (M) of the invention. Crosslinking of the compositions (M) of the invention takes place preferably at room temperature. It can, if desired, also be carried out at higher or lower temperatures than room temperature, as for example at −5° to 15° C. or at 30° to 50° C., and/or by means of concentrations of water that exceed the normal water content of the air.

The crosslinking is carried out preferably under a pressure of 100 to 1100 hPa, more particularly under the pressure of the surrounding atmosphere, in other words approximately 900 to 1100 hPa.

The invention further provides shaped articles produced by crosslinking the mixtures (A) of the invention or the compositions (M), more particularly the compositions (M).

The shaped articles of the invention may be any desired shaped articles, such as, for instance, seals, compression-molded articles, extruded profiles, coatings, impregnation systems, encapsulation, lenses, prisms, polygonal structures, laminate layers, or adhesive layers.

After curing, the compositions (M) of the invention have tensile shear strengths of at least 5 MPa, preferably at least 7 MPa, and more preferably at least 8 MPa.

Additionally provided by the invention is a method for adhesive bonding of substrates, which comprises applying the composition of the invention to the surface of at least one substrate, then contacting said surface with the second substrate to be bonded, and subsequently allowing crosslinking to take place.

Examples of substrates which may be bonded in accordance with the invention are wood in particular, but also plastics, including PVC, concrete, mineral substrates, metals, glass, ceramic, and painted surfaces. Materials both alike and different may be bonded to one another in this case.

Further provided by the invention is a method for producing composites of materials, which comprises applying the composition of the invention to at least one substrate and subsequently allowing crosslinking to take place.

Examples of this are coatings, encapsulation, e.g. encapsulating compositions for LEDs or other electronic components, the production of molded articles, composite materials, and composite moldings. By composite moldings are meant, here, a uniform molded article made from a composite material, which is composed of a crosslinking product of the compositions (M) of the invention and of at least one substrate with a constitution such that between the two components there is a firm, durable bond.

The mixtures (A) of the invention have the advantage that they are easily producible and have the further advantage that they can be used to produce adhesives having outstanding properties.

The compositions (M) of the invention have the advantage that they are easy to produce and the further advantage that they are distinguished by a very long shelflife and a high crosslinking rate. The crosslinkable compositions (M) of the invention further have the advantage that they exhibit an excellent adhesion profile, are easy to process. Furthermore, the crosslinkable compositions (M) of the invention have the advantage that they can be used to obtain adhesives having high tensile shear strength.

In the examples described below, all viscosities are based on a temperature of 25° C. Unless otherwise specified, the examples below are carried out under the pressure of the surrounding atmosphere, in other words approximately at 1000 hPa, and at room temperature, in other words at approximately 23° C., or at a temperature which comes about when the reactants are combined at room temperature without additional heating or cooling, and also at a relative atmospheric humidity of approximately 50%. All statements of parts and percentages, moreover, are based—unless otherwise indicated—on weight.

EXAMPLE 1

A 2000 ml reaction vessel with stirring, cooling, and heating facilities is charged with 630 g (0.15 mol) of a polypropylene glycol having an average molar mass $M_n$ of 4200 g/mol (available commercially under the name Acclaim® 4200 from Bayer Material Science, Leverkusen, Del.) and this initial charge is dried with stirring for 2 hours at 80° C. and 1 mbar. It is then cooled to room temperature, after which 112.5 g (0.45 mol) of a liquid mixture of 2,4'- and 4,4'-MDI (available commercially under the name Desmodur® 2460M from Bayer Material Science, Leverkusen, Del.) are added. Immediately thereafter 0.13 g of a bismuth-containing catalyst (available commercially under the name Borchi® Kat 0244 from Borchers, Langenfeld, Del.) is added, whereupon a gently exothermic reaction begins, which results in the heating of the reaction mixture by about 13° C. The reaction mixture is stirred for a further 60 minutes without external heating, in the course of which it cools back down to room temperature. Subsequently 156.8 g (0.6 mol) of 3-(N-cyclohexyl)aminopropyltrimethoxysilane (available commercially under the name GENIOSIL® GF 92 from Wacker Chemie AG, Munich, Del.) are added. Lastly, the reaction mixture is heated to 80° C. and stirred at that temperature for 1 hour. Isocyanate groups are no longer detectable by IR spectroscopy in the resulting polymer mixture.

The reaction of the isocyanate groups with the isocyanate-reactive groups has proceeded largely statistically. About ⅓ of the isocyanate groups used have reacted with the polyol, and about ⅔ with the added aminosilane.

The result is a clear, transparent polymer mixture which has a viscosity of 75 Pas at 25° C. It can be processed further without problems.

EXAMPLE 2

A 2000 ml reaction vessel with stirring, cooling, and heating facilities is charged with 630 g (0.15 mol) of a polypropylene glycol having an average molar mass $M_n$ of 4200 g/mol (Acclaim® 4200 from Bayer Material Science, Leverkusen, Del.) and this initial charge is dried with stirring for 2 hours at 80° C. and 1 mbar. It is then cooled to room temperature, after which 150.0 g (0.6 mol) of a liquid mixture of 2,4'- and 4,4'-MDI (Desmodur® 2460M from Bayer Material Science, Leverkusen, Del.) are added. Immediately thereafter 0.13 g of a bismuth-containing catalyst (available commercially under the name Borchi® Kat 0244 from Borchers, Langenfeld, Del.) is added, whereupon a gently exothermic reaction begins, which results in the heating of the reaction mixture by about 12° C. The reaction mixture is stirred for a further 60 minutes without external heating, in the course of which it cools back down to room temperature. Subsequently 235.2 g (0.9 mol) of 3-(N-cyclo-hexyl)aminopropyltrimethoxysilane (GENIOSIL® GF 92 from Wacker Chemie AG, Munich, Del.) are added. Lastly, the reaction mixture is heated to 80° C. and stirred at that temperature for 1 hour. Isocyanate groups are no longer detectable by IR spectroscopy in the resulting polymer mixture.

The reaction of the isocyanate groups with the isocyanate-reactive groups has proceeded largely statistically. About ¼ of the isocyanate groups used have reacted with the polyol, and about ¾ with the added aminosilane.

The result is a clear, transparent polymer mixture which has a viscosity of 105 Pas at 25° C. It can be processed further without problems.

EXAMPLE 3

Preparation of a One-Component (1K) Adhesive Formulation 194.6 g of the silane-terminated polyurethane mixture whose preparation is described in example 1, 5 g of N-(2-aminoethyl)-aminopropyltrimethoxysilane (GENIOSIL® GF 9 from Wacker Chemie AG, Munich, Del.), and 0.4 g of dibutyltin bisacetylacetonate are mixed and homogenized in a laboratory planetary mixer from PC-Laborsystem, equipped with two bar mixers, at 200 rpm at about 25° C. for 2 minutes.

The resulting mixture is dispensed into a 310 ml PE cartridge, stored at 25° C. for 24 hours, and then investigated. The results are found in table 1.

EXAMPLE 4

Preparation of a One-Component (1K) Adhesive Formulation 194.6 g of the silane-terminated polyurethane mixture whose preparation is described in example 2, 5 g of N-(2-aminoethyl)-aminopropyltrimethoxysilane (GENIOSIL® GF 9 from Wacker Chemie AG, Munich, Del.), and 0.4 g of dibutyltin bisacetylacetonate are mixed and homogenized in a laboratory planetary mixer from PC-Laborsystem, equipped with two bar mixers, at 200 rpm at about 25° C. for 2 minutes.

The formulation is dispensed into a 310 ml PE cartridge, stored at 25° C. for 24 hours, and then investigated.

EVALUATION OF THE ADHESIVE FORMULATIONS OF EXAMPLES 3 AND 4

The tensile shear strengths of the adhesive formulations from examples 3 and 4 are determined in a method based on DIN EN 204. In this determination, the adhesive is applied to both beech specimens to be bonded, then drawn down using a 100 µm bar coater. The two wooden specimens are then joined over an area of 1 times 2 cm with an applied pressure of 5 kg. Following application of pressure for 24 hours, the specimens are stored under standard conditions for a period of 7 days. Subsequently, the tensile shear strength is determined. The values achieved are those reported in table 1:

TABLE 1

|  | Example 3 | Example 4 |
|---|---|---|
| Tensile shear strength [MPa] | 6.7 | 9.1 |

EXAMPLE 5

Preparation of a One-Component (1K) Adhesive Formulation 102 g of the silane-terminated polyurethane mixture whose preparation is described in example 1 are triturated with 95 g of aluminum trihydroxide having a BET surface area of 3-5 m$^2$/g and a d50 of 1.7-2.1 µm (available commercially under the name "Martinal OL 104" from Albemarle Corp.) with stirring at 600 rpm for one minute. Thereafter, 3 g of N-(2-aminoethyl)-3-aminopropyltrimethoxysilane (GENIOSIL® GF 9 from Wacker Chemie AG, Munich, Del.) are mixed in at 200 rpm for one minute. Subsequently, 0.2 g of dibutyltin bisacetylacetonate is metered in, and the mixture is homogenized at 600 rpm for 2 minutes and at 200 rpm for 1 minute under a pressure of 100 mbar, and stirred until free of bubbles.

The formulation is dispensed into a 310 ml PE cartridge, stored at 25° C. for 24 hours, and then investigated. The results are found in table 2.

EXAMPLE 6

Preparation of a One-Component (1K) Adhesive Formulation 102 g of the silane-terminated polyurethane mixture whose preparation is described in example 2 are triturated with 95 g of aluminum trihydroxide having a BET surface area of 3-5 m$^2$/g and a d50 of 1.7-2.1 µm (available commercially under the name "Martinal OL 104" from Albemarle Corp.) with stirring at 600 rpm for one minute. Thereafter, 3 g of N-(2-aminoethyl)-3-aminopropyltrimethoxysilane (GENIOSIL® GF 9 from Wacker Chemie AG, Munich, Del.) are mixed in at 200 rpm for one minute. Subsequently, 0.2 g of dibutyltin bisacetylacetonate is metered in, and the mixture is homogenized at 600 rpm for 2 minutes and at 200 rpm for 1 minute under a pressure of 100 mbar, and stirred until free of bubbles.

The formulation is dispensed into a 310 ml PE cartridge, stored at 25° C. for 24 hours, and then investigated.

EVALUATION OF THE ADHESIVE FORMULATIONS OF EXAMPLES 5 AND 6

The tensile shear strengths of the adhesive formulations from examples 5 and 6 are determined as described in DIN EN 204. In this determination, the adhesive is applied to both beech specimens to be bonded, then drawn down using a 100 µm bar coater. The two wooden specimens are then joined over an area of 1 times 2 cm with an applied pressure of 5 kg. Following application of pressure for 24 hours, the specimens are stored under standard conditions for the period stated. For the determination of the D1 value, the tensile shear strength of the two bonded specimens is measured directly after storage. In the case of the D4 measurement, the storage period is followed by additional storage in boiling water for six hours. The specimens are subsequently removed from the water, dried off, and stored at room temperature for an hour. This is followed by determination of the tensile shear strength. The values achieved are those reported in table 2:

TABLE 2

| Storage conditions | Tensile shear strength [MPa] | |
| --- | --- | --- |
| | Example 5 | Example 6 |
| D1 (7 days standard conditions) | 10.6 | 13.3 |
| D4 (21 days standard conditions, 6 h boiling water) | 1.8 | 2.6 |

EXAMPLE 7

A 2000 ml reaction vessel with stirring, cooling, and heating facilities is charged with 630 g (0.15 mol) of a polypropylene glycol having an average molar mass $M_n$ of 4200 g/mol (Acclaim® 4200 from Bayer Material Science, Leverkusen, Del.) and this initial charge is dried with stirring for 2 hours at 80° C. and 1 mbar. It is then cooled to room temperature, after which 78.4 g (0.45 mol) of an 80:20 mixture of 2,4- and 2,6-TDI are added. Immediately thereafter 0.13 g of a bismuth-containing catalyst (available commercially under the name Borchi® Kat 0244 from Borchers, Langenfeld, Del.) is added, whereupon a gently exothermic reaction begins, which results in the heating of the reaction mixture by about 14° C. The reaction mixture is stirred for a further 60 minutes without external heating, in the course of which it cools back down to room temperature. Subsequently 156.8 g (0.6 mol) of 3-(N-cyclohexyl)aminopropyltrimethoxysilane (GENIOSIL® GF 92 from Wacker Chemie AG, Munich, Del.) are added. Lastly, the reaction mixture is heated to 80° C. and stirred at that temperature for 1 hour. Isocyanate groups are no longer detectable by IR spectroscopy in the resulting polymer mixture.

The reaction of the isocyanate groups with the isocyanate-reactive groups has proceeded largely statistically. About ⅓ of the isocyanate groups used have reacted with the polyol, and about ⅔ with the added aminosilane.

The result is a clear, transparent polymer mixture which has a viscosity of 27 Pas at 25° C. It can be processed further without problems.

EXAMPLE 8

A 2000 ml reaction vessel with stirring, cooling, and heating facilities is charged with 630 g (0.15 mol) of a polypropylene glycol having an average molar mass $M_n$ of 4200 g/mol (Acclaim® 4200 from Bayer Material Science, Leverkusen, Del.) and this initial charge is dried with stirring for 2 hours at 80° C. and 1 mbar. It is then cooled to room temperature, after which 104.5 g (0.6 mol) of an 80:20 mixture of 2,4- and 2,6-TDI are added. Immediately thereafter 0.13 g of a bismuth-containing catalyst (available commercially under the name Borchi® Kat 0244 from Borchers, Langenfeld, Del.) is added, whereupon a gently exothermic reaction begins, which results in the heating of the reaction mixture by about 13° C. The reaction mixture is stirred for a further 60 minutes without external heating, in the course of which it cools back down to room temperature. Subsequently 235.2 g (0.9 mol) of 3-(N-cyclohexyl)aminopropyltrimethoxysilane (GENIOSIL® GF 92 from Wacker Chemie AG, Munich, Del.) are added. Lastly, the reaction mixture is heated to 80° C. and stirred at that temperature for 1 hour. Isocyanate groups are no longer detectable by IR spectroscopy in the resulting prepolymer mixture.

The reaction of the isocyanate groups with the isocyanate-reactive groups has proceeded largely statistically. About ¼ of the isocyanate groups used have reacted with the polyol, and about ¾ with the added aminosilane.

The result is a clear, transparent polymer mixture which has a viscosity of 35 Pas at 25° C. It can be processed further without problems.

EXAMPLE 9

Preparation of a One-Component (1K) Adhesive Formulation 102 g of the silane-terminated polyurethane mixture whose preparation is described in example 7 are triturated with 95 g of aluminum trihydroxide having a BET surface area of 3-5 m²/g and a d50 of 1.7-2.1 µm (available commercially under the name "Martinal OL 104" from Albemarle Corp.) with stirring at 600 rpm for one minute. Thereafter, 3 g of N-(2-aminoethyl)-3-aminopropyltrimethoxysilane (GENIOSIL® GF 9 from Wacker Chemie AG, Munich, Del.) are mixed in at 200 rpm for one minute. Subsequently, 0.2 g of dibutyltin bisacetylacetonate is metered in, and the mixture is homogenized at 600 rpm for 2 minutes and at 200 rpm for 1 minute under a pressure of 100 mbar, and stirred until free of bubbles.

The formulation is dispensed into a 310 ml PE cartridge, stored at 25° C. for 24 hours, and then investigated. The results are found in table 3.

EXAMPLE 10

Preparation of a One-Component (1K) Adhesive Formulation 102 g of the silane-terminated polyurethane mixture whose preparation is described in example 8 are triturated with 95 g of aluminum trihydroxide having a BET surface area of 3-5 m²/g and a d50 of 1.7-2.1 µm (available commercially under the name "Martinal OL 104" from Albemarle Corp.) with stirring at 600 rpm for one minute. Thereafter, 3 g of N-(2-aminoethyl)-3-aminopropyltrimethoxysilane (GENIOSIL® GF 9 from Wacker Chemie AG, Munich, Del.) are mixed in at 200 rpm for one minute. Subsequently, 0.2 g of dibutyltin bisacetylacetonate is metered in, and the mixture is homogenized at 600 rpm for 2 minutes and at 200 rpm for 1 minute under a pressure of 100 mbar, and stirred until free of bubbles.

The formulation is dispensed into a 310 ml PE cartridge, stored at 25° C. for 24 hours, and then investigated.

EVALUATION OF THE ADHESIVE FORMULATIONS OF EXAMPLES 9 AND 10

The tensile shear strengths of the adhesive formulations from examples 9 and 10 are determined as described in DIN EN 204. In this determination, the adhesive is applied to both beech specimens to be bonded, then drawn down using a 100 µm bar coater. The two wooden specimens are then joined over an area of 1 times 2 cm with an applied pressure of 5 kg. Following application of pressure for 24 hours, the specimens are stored under standard conditions for the period stated. For the determination of the D1 value, the tensile shear strength of the two bonded specimens is measured directly after storage. In the case of the D4 measurement, the storage period is followed by additional storage in boiling water for six hours. The specimens are subsequently removed from the water, dried off, and stored at room temperature for an hour. This is followed by determination of the tensile shear strength. The values achieved are those reported in table 3:

TABLE 3

| Storage conditions | Tensile shear strength [MPa] | |
| --- | --- | --- |
| | Example 9 | Example 10 |
| D1 (7 days standard conditions) | 8.8 | 11.4 |
| D4 (21 days standard conditions, 6 h boiling water) | 1.5 | 1.7 |

The invention claimed is:

1. A crosslinkable composition (M) comprising
   (A) an admixture of at least two different compounds of the formula $$Y\text{—}[NH\text{—}C(=O)\text{—}NR^3\text{—}(CR^1{}_2)_b\text{—}SiR_a(OR^2)_{3-a}]_x \quad (I),$$

where
   Y is an x-valent organic radical,
   $R^3$ are identical or different and are hydrogen, a monovalent, optionally substituted, SiC-bonded hydrocarbon radical, a group $\text{—}(CR^1{}_2)_b\text{—}SiR_a(OR^2)_{3-a}$ or a group $\text{—}CH(COOR')\text{—}CH_2\text{—}COOR'$,
   R' are identical or different and are a monovalent, optionally substituted hydrocarbon radical,
   R are identical or different and are a monovalent, optionally substituted, SiC-bonded hydrocarbon radical,
   $R^1$ are identical or different and is hydrogen or a monovalent, optionally substituted hydrocarbon radical optionally be attached to the carbon atom via nitrogen, phosphorus, oxygen, sulfur, or a carbonyl group,
   $R^2$ are identical or different and are hydrogen or a monovalent, optionally substituted hydrocarbon radical,
   x is an integer from 1 to 10,
   a is identical or different and is 0, 1, or 2, and
   b is identical or different and is an integer from 1 to 10,
   with the provisos that at least a portion of the radicals Y contain at least one urethane and/or urea group, and also at least one polyether and/or polyester group, and that more than 55% of all urethane and urea groups present in the compounds of the formula (I) in the mixture (A) are urea groups which are part of an end group of the formula $$\text{—}NH\text{—}C(=O)\text{—}NR^3\text{—}(CR^1{}_2)_b\text{—}SiR_a(OR^2)_{3-a} \quad (II);$$

(B), optionally polymers which do not conform to the formula (I); and
   (C) at least one basic nitrogen-containing organosilicon compound.

2. The crosslinkable composition (M) of claim 1, further comprising at least one (D) filler, (E) silicone resin, (F) catalyst, (G) adhesion promoter, (H) water scavenger, (I) nonreactive plasticizer, (J) additive, and/or (K) adjuvant.

3. The crosslinkable composition (M) of claim 1, wherein the admixture (A) comprises compound(s) (A1) of the formula $$Y^1\text{—}[NH\text{—}C(=O)\text{—}NR^3\text{—}(CR^1{}_2)_b\text{—}SiR_a(OR^2)_{3-a}]_{x'} \quad (I')$$

and compounds (A2) of the formula $$Y^2\text{—}[NH\text{—}C(=O)\text{—}NR^3\text{—}(CR^1{}_2)_b\text{—}SiR_a(OR^2)_{3-a}]_{x''} \quad (I''),$$

where
   $Y^1$ is an x'-valent organic radical which comprises at least one urethane and/or urea group and at least one polyether and/or polyester unit, and also at least one group $Y^2$,
   $Y^2$ is an x''-valent, optionally substituted hydrocarbon radical having 2 to 40 carbon atoms, an N,N,N-trialkyl-substituted isocyanurate ring, or an N,N,N-triaryl-substituted isocyanurate ring, and which is free from urethane, urea, polyether, and polyester groups,
   x' and x'' each independently of one another are integers of from 1 to 10,
   with the proviso that more than 55% of all the urethane groups and urea groups which are present in the compounds of the formula (I') and (II'') in the admixture (A) are urea groups which are part of an end group of the formula $$\text{—}NH\text{—}C(=O)\text{—}NR^3\text{—}(CR^1{}_2)_b\text{—}SiR_a(OR^2)_{3-a} \quad (II).$$

4. A crosslinkable composition (M), of claim 1, wherein admixture (A) is prepared by reacting
   (a) at least one polyol,
   (b) at least one di- and/or polyisocyanate, and
   (c) at least one aminosilane of the formula $$HNR^3\text{—}(CR^1{}_2)_b\text{—}SiR_a(OR^2)_{3-a} \quad (IV)$$

and/or its partial hydrolysates,
   and also, optionally, further components,
   with the proviso that components (a), (b), and (c) and also any further components are used in a ratio whereby for each mole of isocyanate groups in component (b) and also further isocyanate-functional components optionally present in the reaction mixture there is more than 0.55 mol up to a maximum of 0.95 mol of amino groups in component (c) and they are reacted with the isocyanate groups.

5. The crosslinkable composition of claim 1, which contains no nonreactive plasticizers (I).

6. A process for producing the composition (M) of claim 1, comprising mixing the individual components in any order.

7. A shaped article produced by crosslinking a composition (M) of claim 1.

8. A method for the adhesive bonding of substrates, comprising applying a composition (M) of claim 1 to the surface of at least one substrate, and contacting the surface of the at least one substrate with a second substrate to be bonded, and allowing crosslinking of the composition to take place.

9. A method for producing composite materials, comprising applying a composition (M) of claim 1 to at least one substrate and allowing crosslinking of the composition to take place.

* * * * *